UNITED STATES PATENT OFFICE.

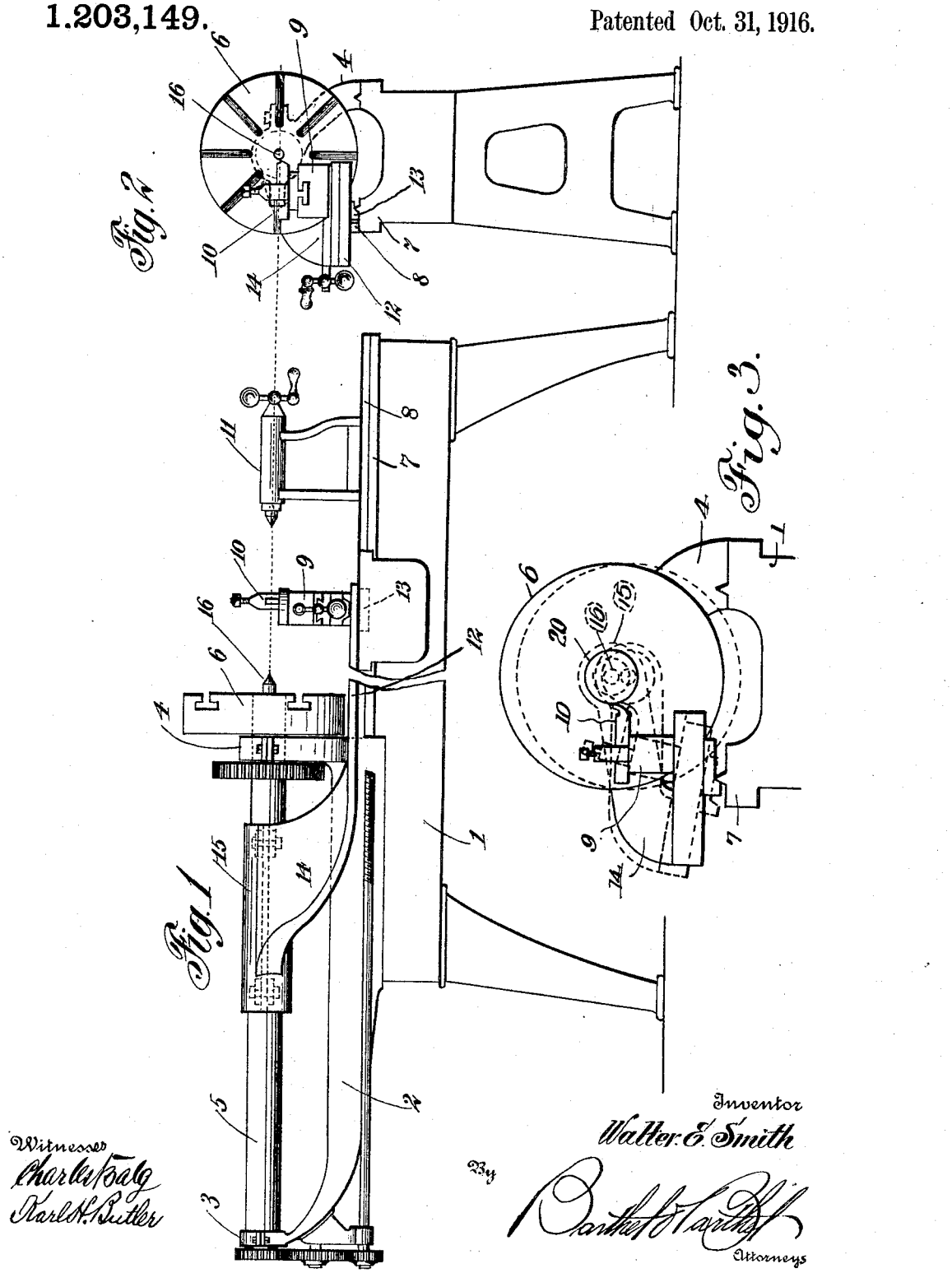

WALTER E. SMITH, OF DETROIT, MICHIGAN.

LATHE.

1,203,149.

Specification of Letters Patent.

Patented Oct. 31, 1916.

Application filed April 10, 1916. Serial No. 90,155.

*To all whom it may concern:*

Be it known that I, WALTER E. SMITH, a citizen of the United States of America, residing at Detroit, in the county of Wayne and State of Michigan, have invented certain new and useful Improvements in Lathes, of which the following is a specification, reference being had therein to the accompanying drawings.

In the operation of lathes and similar machines, including head and tail stocks and a tool holder, there are often inequalities between the supports of a head stock and a tool holder, due to wear, that interfere with accuracy in connection with operations upon a piece of work solely held by the head stock, and it is the primary object of my invention to furnish such a lathe or machine with means for maintaining a tool holder in proper relation to a head stock, irrespective of what wear takes place in connection with the head stock bearings or tool holder shears or guides.

A further object of this invention is to furnish a lathe with a simple, durable and inexpensive attachment of the above type which will eliminate emergency liners and bushings ordinarily employed to compensate for wear and at the same time not interfere with the usual operations in a lathe.

My invention will be better understood from the following description taken in connection with the drawing, wherein—

Figure 1 is a side elevation of a lathe in accordance with my invention, Fig. 2 is an end view of the same with the tail stock removed, and Fig. 3 is a diagrammatic view of a portion of the lathe, showing an exaggerated abnormal position of the attachment.

In the drawing, 1 denotes a lathe frame or bed having an extension 2 provided with bearings 3 and 4 for the driven shaft 5 of a head stock 6, these elements being of a conventional form associated with a change speed mechanism, a chuck and other devices common to various types of lathes.

The front shear 7 of the lathe frame or bed 1 has a guide 8 extending from the head stock 6 to the outer end of the lathe, and on said guide is a tool holder 9 having the usual adjustment and clamp for holding a tool 10 relative to a piece of work held by the head stock or between said head stock and a tail stock 11, on the shears of the lathe frame or bed. The tool holder 10 is on one end of a support 12 resting upon the shear 7 and said support has a depending lug 13 engaging the inner side of the longitudinal guide 8, said lug preventing side thrust of the support 12 and the tool holder carried thereby. The support 12 has one end thereof curved upwardly in the direction of the driven shaft 5 and this end of the support conforms to an arm or web 14 having a split sleeve or bearing 15 which is loosely held on the driven shaft 5, said split sleeve allowing the shaft 5 to freely revolve, but not to move in a vertical or lateral plane without moving the support 12. In consequence of this connection between the tool holder 9 and the shaft 5, should there be any wear in the bearings 3 and 4 which would cause the shaft 5 to shift in a vertical or lateral plane, the support 12 is correspondingly shifted, thus maintaining the tool holder 9 in proper relation to the axis of the head stock 6. This is best understood by reference to the diagrammatic view showing a piece of work 20 held centrally of the head stock 6. Assuming that the bearing 4 wears and allows the shaft 5 to lower the head stock to the position shown in dotted lines then the sleeve or bearing 15 is lowered, causing the tool post 9 to tilt on the front shear 7 of the lathe body. When the tool post is tilted, it does not destroy the relation of the tool 10 relative to the piece of work 20, since the arm or web 14 maintains a fixed relation between the tool post and the sleeve or bearing 15.

With the tool 10 operating upon a piece of work held in the chuck of the head stock 6, there is always a tendency to displace the center piece 16 of the head stock relative to the tool holder 9, and such movement of the tool holder is prevented by the lug 13 engaging the inner side of the guide 8. The stresses and strains to which the head stock is subjected when a piece of work is being operated upon causes wear at the bearings 3 and 4; consequently there will be certain inequalities between the longitudinal axis of the head stock and the lathe frame or bed. With an ordinary lathe, the tool holder 9 maintains its original position, while the head stock, due to wear in the bearings 3 and 4, assumes a position other than its original location and sometimes the wear causes a lateral movement of the center piece 16, but irrespective of the direction in which the center piece 16 moves, the tool holder is simultaneously moved therewith, thus maintaining proper relation between the head stock and the tool holder for accurate operation.

One embodiment of my invention has been illustrated, but it is to be understood that the structural elements are susceptible to such variations and modifications as fall within the scope of the appended claims.

What I claim is:—

1. In a lathe having a shear, a head stock having a driven shaft, and a tool holder tiltable relative to the lathe shear and having a support loosely connected to the driven shaft of said head stock and self alining therewith.

2. In a lathe having a shear, a head stock having a driven shaft, a tool holder tiltable on the lathe shear, and a support extending from said driven shaft for said tool holder.

3. In a lathe, a head stock having a driven shaft, a guide, a tool holder, a tiltable support on said guide for said tool holder and loosely connected to the driven shaft of said stock.

4. An attachment for a lathe having a shear, comprising a tool holder support having connection with the head stock of the lathe to have a tilting action on the lathe shear relative to the head stock of the lathe.

In testimony whereof I affix my signature in presence of two witnesses.

WALTER E. SMITH.

Witnesses:
  KARL H. BUTLER,
  ANNA M. DORR.

Copies of this patent may be obtained for five cents each, by addressing the "Commissioner of Patents, Washington, D. C."